United States Patent [19]
Rietsch

[11] Patent Number: 4,468,761
[45] Date of Patent: Aug. 28, 1984

[54] NOISE SUPPRESSION METHOD

[75] Inventor: Eike Rietsch, Houston, Tex.

[73] Assignee: Deutsche Texaco Aktiengesellschaft, Hamburg, Fed. Rep. of Germany

[21] Appl. No.: 265,262

[22] Filed: May 20, 1981

Related U.S. Application Data

[63] Continuation-in-part of Ser. No. 936,677, Aug. 24, 1978, abandoned, which is a continuation-in-part of Ser. No. 864,712, Dec. 27, 1977, abandoned.

[30] Foreign Application Priority Data

Dec. 24, 1976 [DE] Fed. Rep. of Germany ....... 2658954

[51] Int. Cl.$^3$ ............................................. G01V 1/36
[52] U.S. Cl. ....................................... 367/43; 367/21; 367/40; 367/47
[58] Field of Search ....................... 367/39, 40, 42, 43, 367/46, 47, 63, 67, 73

[56] References Cited

U.S. PATENT DOCUMENTS

| | | | |
|---|---|---|---|
| 2,794,965 | 6/1957 | Kost | 367/46 |
| 3,398,396 | 8/1968 | Embree | 367/46 |
| 4,208,732 | 6/1980 | Ruehle | 367/52 X |

OTHER PUBLICATIONS

"The Kahlmer Filter as a Prediction Error Filter", Otl et al., Geophysical Prospecting, vol. 20, No. 3 Sep. 1972, pp. 549–560.
"Predictive Deconvolution Applied to Long Range Seismic Reflection Observations", Mitchell et al., Pageoph, vol. 96, 1972, pp. 127–132.
Whalen, Anthony D., *Datection of Signals in Noise*, Academic Press (1971), pp. 363–389, copy in Scientific Library (PTO).

*Primary Examiner*—Maynard R. Wilbur
*Assistant Examiner*—K. R. Kaiser
*Attorney, Agent, or Firm*—Robert A. Kulason; Carl G. Ries; Ronald G. Gillespie

[57] ABSTRACT

A method, when practiced, enhances seismic data so as to suppress noise in the seismic data. The seismic data was generated in a conventional manner by at least one receiver apparatus whose position does not substantially change. The method includes combining at least two elementary seismograms to form noise seismograms containing little or none of the desired signal. The number of different noise seismograms so derived is at least equal to the number of elementary seismograms to be combined to form a final seismogram. The probability distribution of noise is determined for each trace of the noise seismograms from the probability distributions of noise in the traces of the noise seismograms. The most probable form of the desired signals is derived from the probability distribution of noise in the traces of the elementary seismograms to provide the enhanced seismic data.

14 Claims, 7 Drawing Figures

RANDOM NOISE

NON-RANDOM NOISE

AMBIENT NOISE

AUTO-COVARIANCE OF RANDOM NOISE

AUTO-COVARIANCE OF NON-RANDOM NOISE

AUTO-COVARIANCE OF AMBIENT NOISE

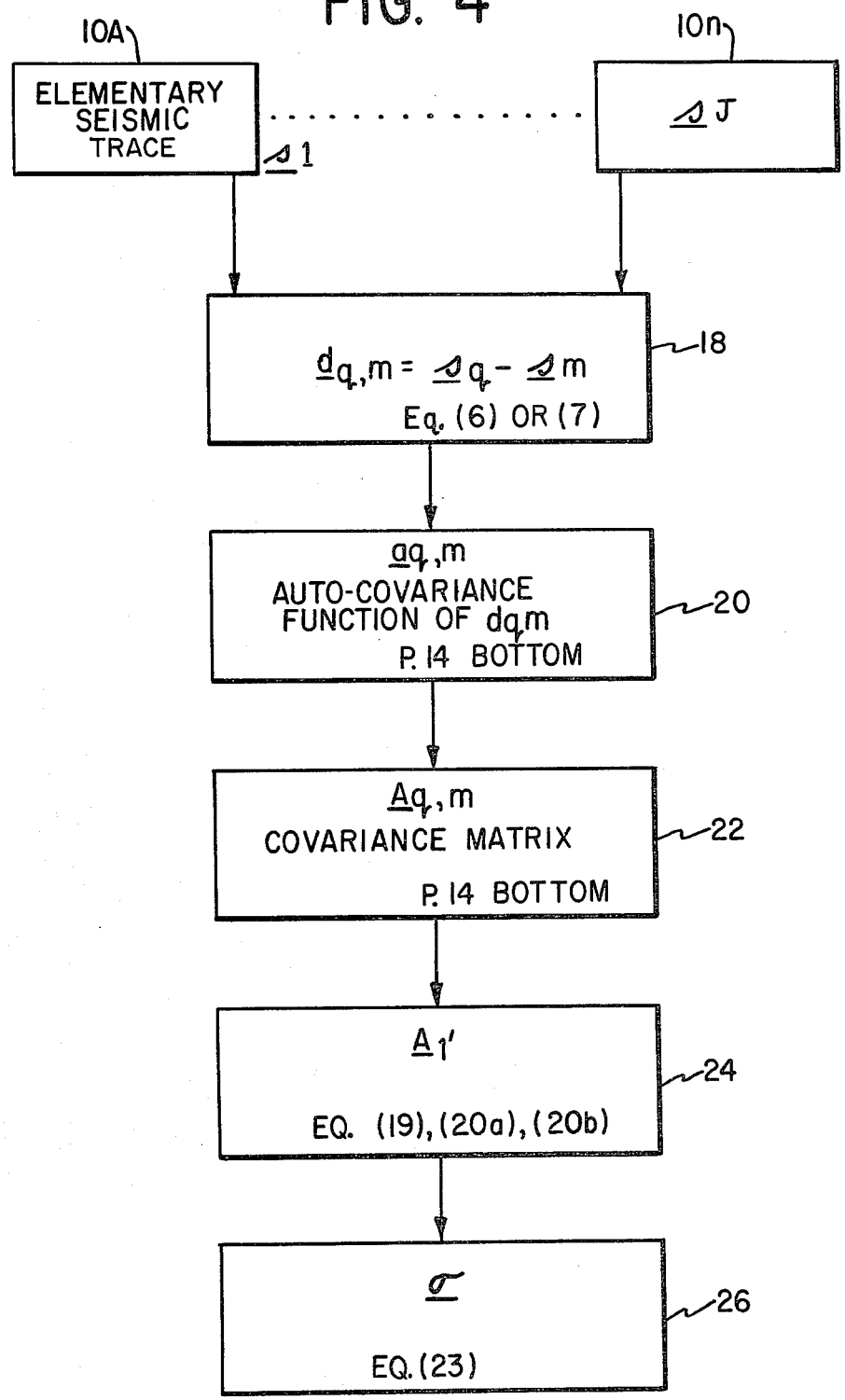

NOISE SUPPRESSION METHOD

REFERENCE TO RELATED APPLICATIONS

This application is a continuation-in-part of the now abandoned application of the same inventor filed on Aug. 24, 1978 under Ser. No. 936,677 which in turn is a continuation-in-part application of now abandoned application filed on Dec. 27, 1977 under Ser. No. 864,712. The applicant hereby incorporates by reference said application Ser. No. 936,677 into this continuation-in-part application and claims the benefit of the priority filing dates of Dec. 27, 1977 and Aug. 24, 1978 as to any subject matter which has been disclosed or claimed in said applications Ser. No. 864,712 and 936,677 and has been hereby incorporated by reference in this application.

BACKGROUND OF THE INVENTION

1. Field of the Invention

The invention relates to a method of seismic data enhancement to suppress noise.

2. Description of the Prior Art

In seismic exploration a signal is provided at or in the vicinity of the earth's surface. Part of the signal penetrates into the subsurface and is reflected at the interfaces of geological formations linked with changes in the elastic properties. With the aid of a plurality of receivers, these reflected signals are recorded at the surface in the form of analog signals or as series of digital values called traces. The total number of simultaneously recorded traces is termed a seismogram. These receivers record not only earth vibrations generated by the reflections of the emitted seismic signal, hereinafter called the desired signal, but also incidental earth vibrations. Earth vibrations not related to the emitted signal as, for example, caused by traffic, machines or by the swaying of trees in the wind whose motion is transferred by the roots to the earth, are called uncorrelated noise. This also applies to the noise generated by ships in off-shore seismic. In addition, waves occur in connection with the emitted signal, such as surface waves or the airwave which, however, are not regarded as the desired signal but as organized noise.

In order to reduce the noise in the recorded seismogram whose energy can exceed that of the reflected desired signal when using the conventional surface sources of seismic energy, it is usual to emit several signals in succession and to add the individual elementary seismograms obtained with these signals to form a final seismogram (vertical stacking). In order, furthermore, to attenuate the organized noise, the individual seismic signals are emitted from different points which are set not too far apart. As a consequence, surface-coupled, correlated noise trains are attenuated to a greater degree than the recorded desired signals coming from deep interfaces.

So-called horizontal stacking performed in the further course of processing seismic data is based on the same principle. In horizontal stacking all traces containing reflected signals from identical subsurface points are combined to form one trace. Differences in the propagation time of the signals are compensated for prior to stacking by so-called static and dynamic corrections.

This kind of noise suppression is only optimal if the amplitudes of the noise are normally distributed on all traces, have the same variance on all traces and are completely uncorrelated. The last condition means not only—as presupposed in the following—that no connection exists between the noise on difference traces, but also that on each trace of a seismogram, the amplitude of the noise at a certain time is completely independent from the amplitudes of the noise at other times.

In an improved method (U.S. Pat. No. 3,398,396) called diversity stack, the traces are divided into individual sections. In each section the total amount of energy of the desired signal and of the noise is determined and allocated to the middle of the interval. When adding the individual seismograms the values of these traces are multiplied by factors which are determined by interpolation from the reciprocal values of the total energy allocated to the centres of the two neighboring sections. This method is advantageous if the amplitudes of the noise are normally distributed and uncorrelated.

Further methods for the suppression of noise by weighted vertical stacking are described, for example, in the U.S. Pat. No. 3,622,967 (Foster et al) and the Canadian Pat. Nos. 904,971 (George et al) and 932,443 (Diltz et al). In these three publications, different methods are used to determine weight factors with the aid of which traces with a higher proportion of noise are taken into less account in the addition than traces with less noise.

These methods of noise suppression are not optimal, particularly when the noise is not distributed completely at random but has a certain structure. This is, for example, the case when not all frequencies occur to the same extent in the noise but some frequencies of narrow frequency bands are particularly strongly represented and expresses itself, for example, in that the autocovariance function of the noise has not only main maximum but also pronouned secondary maxima. In this case it is possible to use the noise received over a certain period of time to deduce the noise earlier or later times. The noise is to a certain extent—at least for short periods of time—predictable. Expressed differently this means that the probability for the occurrence of a certain noise amplitude is not independent of the noise amplitudes at earlier or later times.

The present invention is a method for suppressing noise in seismic data which are provided with the aid of energy sources capable of radiating reproducible signals into the subsurface and which are recorded by at least one receiver or one receiver group whose position does not change at all or only slightly, in the form of an analog signal, or a series of digital numerical values, the totality of the elementary traces recorded when a signal is radiated from the receiver/receivers or receiver groups being termed an elementary seismogram and the elementary seismograms being combined to form a final seismogram to improve the ratio of desired signal to noise, and said method also being provided for suppressing noise trains in seismic data with different transmitting and recording points but a common point of reflection, said method characterized in that these elementary seismograms are all brought into that form which they would have if they had all been provided by the same signal; that by combination of at least two elementary seismograms, noise seismograms are formed which no longer contain the desired signal or in which the energy of the desired signal is negligible compared with that of the noise, the number of different noise seismograms being at least equal to the number of elementary seismograms to be combined to form a final seismogram; the probability distribution of the noise is determined for each trace of the noise seismogram; the probability distribution of the noise in the traces of the elementary seismograms is determined from the probability distributions of the noise in the traces of the noise seismograms; and in that the most probable form of the desired signals is determined from the probability distribution of the noise in the traces of the elementary seismograms.

The objects and advantages of the invention will appear more fully hereinafter from a consideration of the detailed description which follows, taken together with the following drawing wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 4 is a flow diagram of the steps of the method, in accordance with the present invention, which achieves statistically optimum stacking of elementary traces.

DESCRIPTION OF THE INVENTION

Figure 1A:
FIG. 1A through 3B are graphical representations of different signals and the way in which relations between the function values are expressed in the autocorrelation function.
Figure 2A:
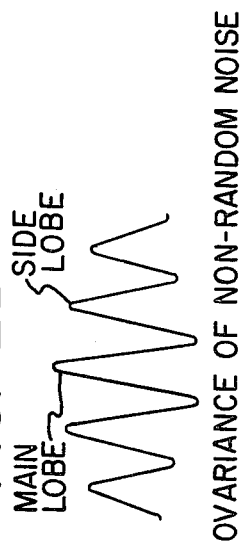
Figure 3A:
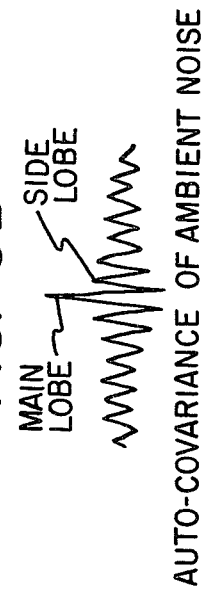
Figure 1B:
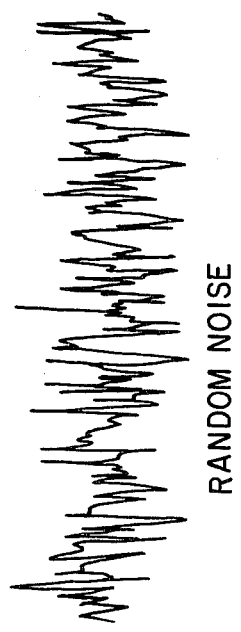
Figure 2B:
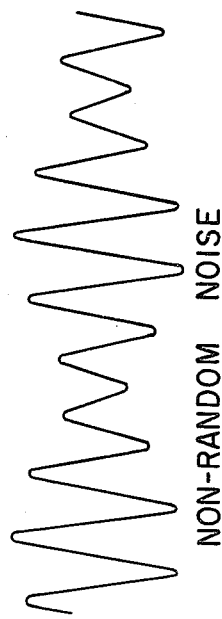
Figure 3B:

To describe the fundamentals of the method it is sufficient to take a look at the elementary traces recorded by one receiver which are to combined to form a final trace. If several receivers are present, as is usually the case, then the method must be applied to the elementary traces of each receiver. The elementary traces shall consist of a series (time series) of N digitally stored numerical values which represent the amplitude of the recorded ground movement at certain equidistant times $t_k = k\Delta t$, $\Delta t$ denoting the sampling interval and the recording time being equal to $(N-1)\Delta t$. To suppress noise by vertical stacking at least three like signals are emitted and the reflected signals recorded, the energy source and receiver being in substantially unchanged position. In the following, $s_{j,k}$ denotes the k-th amplitude value recorded at the time $t_k$ as a result of the j-th signal emitted at the time $t_o = 0$. This value consists of the actual desired signal $\sigma_k$ and noise $n_{j,k}$. The index j is missing from the desired signal because the signal emitted by the energy source is repeatable and the desired signal is, therefore, identical on all elementary traces. Thus, the following relation applies $$s_{j,k} = \sigma_k + n_{j,k}. \tag{1a}$$

When analyzing time series it is usual to employ a vector representation. This means that the time index separated here by a semicolon from the other indices is omitted and the variable is characterized as a vector by underlining or printing in bold-faced type.

Equation (1a) may be rewritten as $$\underline{s}_j = \underline{\sigma} + \underline{n}_j \tag{1b}$$

for the j-th trace. This convention is also used in the following.

In normal stacking the mean value is formed from J elementary traces.

$$\underline{\bar{s}} = (1/J) \sum_{j=1}^{J} \underline{s}_j \tag{2}$$

In diversity stacking a weighted mean value is formed $$\underline{\bar{s}} = \left[ \sum_{j=1}^{J} \underline{s}_{j,k} W_{j,k} \right] / \sum_{j=1}^{J} W_{j,k} \tag{3}$$

the $W_{j,k}$ being determined for the k-th of the j-th trace by interpolation from the reciprocal value of the energy content of two neighboring sections of the j-th elementary trace.

In the method of the present invention, the probability distribution, denoted by $P_j(\underline{n})$, noise $\underline{n}_j$ in the j-th trace is determined in a manner hereinafter described. This probability distribution describes the probable noise amplitude and the relationship between noise amplitudes at different times, that is, it describes a statistical relationship between all the $n_{j,k}$ having the same index j. The probability distribution of the signal amplitudes $\underline{s}_j$ for the j-th trace is determined with the aid of the equation (1b) as $P_j(\underline{s} - \underline{\sigma})$.

As well known method of determining the most likely desired signal from a probability distribution is the maximum likelihood method (cf. M. G. Kendall, A. Stuart, *The Advanced Theory of Statistics*, Vol. 1, 3rd Edition, Ch. Griffin & Co. Ltd., London, 1969, pages 201-204). In this method the recorded values $\underline{s}_j$ are substituted for $\underline{s}$ in $P_j(\underline{s} - \underline{\sigma})$ which gives the probability $P_j(\underline{s}_j - \underline{\sigma})$ for the occurrence of these values. The product of the probabilities of all traces is developed $$P(\underline{s}_1 - \underline{\sigma}, \ldots, \underline{s}_J - \underline{\sigma}) = \prod_{j=1}^{J} P_j(\underline{s}_J - \underline{\sigma}) \tag{4}$$

and the desired signal $\underline{\sigma}$ is determined which maximizes the product. For practical reasons maximization is often performed of $$L(\underline{s}_1 - \underline{\sigma}, \ldots, \underline{s}_J - \underline{\sigma}) = \log P(\underline{s}_1 - \underline{\sigma}, \ldots, \underline{s}_J - \underline{\sigma}) \tag{5}$$

which yields the same result. The maximum is found in a known manner by differentiating $L(\underline{s}_1 - \underline{\sigma}, \ldots, \underline{s}_J - \underline{\sigma})$ with respect to $\sigma_j$ and equating the derivatives to zero.

In order to be able to carry out the method it is necessary to establish the probability distribution of noise $P_j(\underline{n})$ in the elementary traces. To do so, the differences of pairs of elementary traces, hereinafter called noise traces are formed. These noise traces $\underline{d}_{q,m}$ have the form $$\underline{d}_{q,m} = \underline{s}_q - \underline{s}_m = \underline{n}_q - \underline{n}_m,$$

for $1 < m \leq J$. This relationship shows that the desired signal no longer occurs in a noise trace. Thus, from three elementary traces, the following three different noise traces are formed.

$$\underline{d}_{1,2} = \underline{n}_1 - \underline{n}_2 \tag{7}$$

$$\underline{d}_{2,3} = \underline{n}_2 - \underline{n}_3$$

$$\underline{d}_{1,3} = \underline{n}_1 - \underline{n}_3$$

It is possible to determine a probability distribution for the values of each noise trace. Such a probability distribution describes the probability for the occurrence of noise amplitudes in this noise trace at a certain time in relation to the noise amplitudes of the noise trace at other times, that is, it describes statistical relationship between the values $d_{q,m;k}$ having the same index pair q,m. It is not necessary that the statistical properties remain the same for all times, but only that they do not undergo any substantial change over a sufficiently long period of time. The manner in which such a probability distribution is obtained is described in the literature on statistical data analysis. One method will be described later when we come to the description of preferred embodiments.

Knowing the probability distribution for the values of noise traces $\underline{d}_{q,m}$, the probability distribution of the amplitudes of noise $n_j$ in the J elementary traces is determined in a manner hereinafter described.

Noise trace $\underline{d}_{q,m}$ is equal to the difference between two noise traces $\underline{n}_q$ and $\underline{n}_m$ with the desired probability distributions $P_q(\underline{n})$ and $P_m(\underline{n})$, respectively. The probability distribution $P_{q,m}(\underline{d})$ of the noise trace $\underline{d}_{q,m}$ is therfore $$P_{q,m}(\underline{d}) = \int P_q(\underline{n}+\underline{d}) \, P_m(\underline{n}) d\underline{n}, \qquad (8)$$

the intergration being carried out over all components of the vector n, and $dn = dn_0 \, dn_1 \ldots dn_{N^-}$ presenting the N-dimensional volume element (M. G. Kendall, A. Stuart, *The Advanced Theory of Statistics*, Vol. 1, 3rd Edition, Ch. Griffin & Co. Ltd., London, 1969, page 263). The probability distribution of noice trace $d_{q,m}$ is equal to the corss-correlation of the probability distributions of noice in the q-th and m-th elementary trace. For characteristic functions the relation (8) reads $$p_{q,m}(\underline{\omega}) = p_q(\underline{\omega}) p_m^*(\underline{\omega}). \qquad (9)$$

Here the characteristic function which is defined as the inverse Fourier transform of the probability distribution is denoted by a small "p" (M. G. Kendall, A. Stuart, *The Advanced Theory of Statistics*, Vol. 1, 3rd Edition, Ch. Griffin & Co. Ltd., London, 1969, page 94), and a superscripted asterisk (*) represents the transition to the complex-conjugate. The relation can be linearized by taking the logarithm thereby yielding $$\text{ti log } P_{q,m}(\underline{\omega}) = \log P_q(\underline{\omega}) + \log P_m(\underline{\omega}) \qquad (10)$$

If it is reasonably supposed that positive and negative values of noise occur with equal probability, that the probability distribution is hence invariant with respect to a change in the sign of noise, then the characteristic functions are real, and the logarithm of the characteristic function of the probability distribution of the difference of noise in the q-th and m-th single trace is equal to the sum of the logarithms of the characteristic functions of the probability distribution of noise in the q-th and m-th elementary trace.

If at least as many different noise traces are available as are elementary traces and if each elementary trace is represented in at least one of these noise traces, then the probability distribution $P_m(\underline{n})$ of noise in the elementary traces can be determined in general from $P_{q,m}(\underline{d})$ via equation (10) between the characteristic functions of $P_{q,m}(\underline{d})$ and $P_m(\underline{n})$.

Since the number of different possible noise traces provided by the subtraction of two elementary traces is equal to $J(J-1)/2$, wherein J represents the number of elementary traces which are combined to a final trace, it will follow that there are as many different noise traces as elementary traces for $J=3$ and an even greater number of different noise traces than elementary traces for $J>3$ so that it is not necessary to form all possible noise traces. It will suffice in principle to form just so many different noise traces as there are elementary traces available. If, for example, the following noise traces are formed $$\underline{d}_{2}, \underline{d}_{2,3}, \ldots, \underline{d}_{J-1}, \underline{d}_{1,J}, \text{ for J odd,}$$

or $$\underline{d}_{1,2}, \underline{d}_{2,3}, \ldots, \underline{d}_{J-1,J}, \underline{d}_{1,J-1}, \text{ for J even,}$$

then from the corresponding characteristic functions $$p_{1,2}(\underline{\omega}), p_{2,3}(\underline{\omega}), \ldots, p_{J-1,J}(\underline{\omega}), p_{1,J}(\underline{\omega}), \text{ for J odd,}$$

or $$p_{1,2}(\underline{\omega}), p_{2,3}(\underline{\omega}), \ldots, p_{J-1,J}(\underline{\omega}), p_{1,J-1}(\underline{\omega}), \text{ for J even,}$$

respectively, it is possible to determine the characteristic functions $p_j(\underline{\omega})$ of the probability distribution of noise in the elementary traces J. This determination may be accomplished using the recursive relation derived from (10) to develop $$\log p_{j+1}(\underline{\omega}) = \log p_{j,j+1}(\underline{\omega}) - \log p_j(\underline{\omega}) \quad j=1,2,\ldots,J-1, \qquad (11)$$

whereby $$\log p_1(\underline{\omega}) = \tfrac{1}{2}\left[\sum_{j=1}^{J-1}(-1)^{j-1}\log p_{j,j+1}(\underline{\omega}) + \log p_{1,J}(\underline{\omega})\right] \qquad (12a)$$

stands for an odd number and $$\log p_1(\underline{\omega}) = \tfrac{1}{2}\left[\sum_{j=1}^{J-2}(-1)^{j-1}\log p_{j,j+1}(\underline{\omega}) + \log p_{1,J-1}(\underline{\omega})\right] \qquad (12b)$$

for an even number of elementary traces, respectively.

These relationships are only intended as an example of how to determine the $p_j(\underline{\omega})$ from the $p_{q,m}(\underline{\omega})$. Many equivalent methods are known to those of skill in the art by means of which the characteristic functions of noise in the J elementary traces can be determined from J mutually independent characteristic functions of the noise traces.

Statistical variations in the probability distribution for the values in the noise traces can be counteracted by using more noise traces than there are elementary traces available and by determining the $p_j(\underline{\omega})$ from the relations (10) by minimizing a norm.

Once the $p_j(\underline{\omega})$ are known, the desired probabilities $P_j(\underline{n})$ for the noise in the j-th elementary trace can be determined by means of a Fourier transformation.

By virtue of the relationship shown in the foregoing, the following method, with reference to FIG. 4, can be given for suppressing noise in seismic traces.

At least three elementary traces $s_j$, each of which contains substantially the same desired signal, are recorded for one geophone.

Noise traces $\underline{d}_{q,m}$ are formed from these elementary traces by subtraction, the number of the noise traces formed being at least equal to the number of elementary traces and each of the elementary traces being represented in at least one noise trace (indicated in block 18).

Probability distributions $P_{q,m}(d)$ for the values of the noise traces are determined using equation 8.

From the probability distribution for the values of the noise traces there is obtained the probability distribution $P_j(n)$ for the values of noise $n_j$ in the elementary traces.

From the probability distribution for the values of noise there is obtained the probability distribution $P_j(s-\sigma)$ for the values for the j-th elementary trace.

By substituting the recorded values for $s$ in the probability distribution of the values of the elementary traces and forming the product, the probability can be determined for the occurence of the recorded values in all elementary traces. By applying the maximum likelihood method the desired signal $\sigma$ can be found.

This above-described method permits of a series of modifications. In particular, it is not necessary to form noise traces by combination of only two elementary traces. Any number of elementary traces in the form $$d_q = \sum_{j=1}^{J} g_{q,j} s_j = \sum_{j=1}^{J} g_{q,j} n_j \tag{13}$$

can be combined to form noise traces, the weights $g_{q,j}$ having one of the three possible values $g,0,-g$, and $q$ representing an index vector (vector of indices) whose $J$ components have the values $g_{q,j}$. In addition $$\sum_{j=1}^{J} g_{q,j} = 0 \tag{14}$$

must apply, and the matrix $g$ with the elements $G_{q,j} = g_{q,j}^2$ must at least have the rank $J$. In this case, the characteristic functions of the probability distribution of the noise values in the elementary traces can be determined from the characteristic functions of the probability distribution of the values of the noise traces with the aid of the relation $$\log p_q(\omega) = \sum_j \log p_j(g\omega), \tag{15}$$

which represents a generalization of equation (10). The sum in equation (15) extends over all values of $j$ for which $g_{,q,j} \neq 0$ is valid.

The following four noise traces can serve for $J=4$ as an example of this subtraction.

$$d_{1,1-1,-1} = s_1 + s_2 - s_3 - s_4$$

$$d_{0,1,-1,0} = s_2 - s_3$$

$$d_{0,0,1,-1} = s_3 - s_4$$

$$d_{1,0,-1,0} = s_1 - s_3$$

In this case the first noise trace is a combination of all four elementary traces.

To determine the probability distribution of the values of the noise traces, a whole series of methods presents themselves which, however, generally require various assumptions of a restrictive nature. As many important properties of stationary processes can be described by the first two moments of the probability distribution, second order stationarity will suffice (J. B. Thomas, *An Introduction to Statistical Communication Theory*, J. Wiley & Sons, Inc., New York, 1969, page 84 et seq.). In this case the expected noise amplitudes and the relations between noise amplitudes at different times are described by the autocovariance function. The probability distributions resulting therefrom are given in the following.

The relationship of noise and its autocovariance can be seen with reference to FIGS. 1A through 3B. FIG. 1A depicts a random noise signal while FIG. 1B shows the random noise autocovariance function which has little predictability in the noise signal. As can be seen, the autocovariance has a solitary spike. Non-random noise, shown in FIG. 2A, has an autocovariance, shown in FIG. 2B, that features side lobes almost as high as the main lobe. When the side lobes of an autocovariance function are almost as high as the main lobe, the noise signal is very predictable. The third case is ambient noise, shown in FIG. 3A, which consists of random noise and non-random noise. The ambient noise autocovariance function, shown in FIG. 3B, has a main lobe, but the side lobes are not as high as is the case in FIG. 2B but greater than the almost non-existing side lobes in FIG. 1B. This represents that the ambient noise signal has some degree of predictability resulting from its non-random portion.

If $a_{q,m}$ denotes the autocovariance function of the noise trace $d_{q,m}$ and if $A_{q,m}$ denotes the covariance matrix of the noise trace $d_{q,m}$ as formed from the elements $A_{q,m;j,k} = a_{q,m;j-k}$, then the probability distribution of the noise ammplitudes in the noise trace $d_{q,m}$ will have the form $$P_{q,m}(d) = [(2\pi)^N |A_{q,m}|]^{-\frac{1}{2}} \exp(-\tfrac{1}{2} d' A_{q,m}^{-1} d) \tag{16}$$

wherein $N$ represents the number of values in the noise trace, $|A_{q,m}|$ the determinant and $A_{q,m}^{-1}$ the inverse of the matrix $A_{q,m}$, and $d'$ is the vector transposed to $d$.

The characteristic function for this probability distribution (cf. M. G. Kendall and A. Stuart, *The Advanced Theory of Statistics*, Vol. 1, 3rd Edition, Ch. Griffin & Co. Ltd., London, 1969, pages 347-349) is as follows:

$$p_{q,m}(\omega) = \exp(-\tfrac{1}{2} \omega' A_{q,m} \omega). \tag{17}$$

With the aid of, for example, equations (11 and 12) there is obtained $$p_j(\omega) = \exp(-\tfrac{1}{2} \omega' A_j \omega) \tag{18}\text{-ps}$$

the covariance matrices of noise in the elementary traces $A_j$ being defined by the recursive relations $$A_{j+1} = A_{j,j+1} - A_j \quad j = 1,2,\ldots,J-1 \tag{19}$$

and the matrix $A_1$ being defined by $$A_1 = \tfrac{1}{2} \left[ \sum_{j=1}^{J-1} (-1)^{j-1} A_{j,j+1} + A_{1,J} \right] \tag{20a}$$

for $J$ odd and by $$A_1 = \tfrac{1}{2} \left[ \sum_{j=1}^{J-2} (-1)^{j-1} A_{j,j+1} + A_{1,J-1} \right] \tag{20b}$$

for $J$ even, respectively.

The probability distributions for noise $n_j$ in the elementary traces follow from equation (18)

$$P_j(n) = [(2\pi)^N |A_j|]^{-\frac{1}{2}} \exp(-\tfrac{1}{2} n' A_j^{-1} n) \tag{21}$$

The probability distribution $P_j(\underline{s}-\underline{\sigma})$ of the values in the single traces gives the probability for the measuring of the signals $s_j$ as being $$P(\underline{s}_1 - \underline{\sigma}, \underline{s}_2 - \underline{\sigma}, \ldots, \underline{s}_J - \underline{\sigma}) = \prod_{j=1}^{J} P_j(\underline{s}_j - \underline{\sigma}) = \quad (22)$$

$$(2\pi)^{-NJ/2} \prod_{j=1}^{J} |\underline{A}_j| \exp\left[-\tfrac{1}{2} \sum_{j=1}^{J} (\underline{s}_j - \underline{\sigma})' \underline{A}_j^{-1} (\underline{s}_j - \underline{\sigma})\right]$$

The most probable value of the vector $\underline{\sigma}$ results therefrom by differentiating the logarithm of $P(\underline{s}_1-\underline{\sigma}, \underline{s}_2-\underline{\sigma}, \ldots \underline{s}_J-\underline{\sigma})$ with respect to the values (components of $\underline{\sigma}$ and by equating the derivatives to zero. Solution of the resulting linear system of equation $$\left[\sum_j \underline{A}_j^{-1}\right] \underline{\sigma} = \sum_j \underline{A}_j^{-1} \underline{s}_j \quad (23)$$

yields the most probable desired signal $\underline{\sigma}$. These equations simplify if the noise values are statistically independent of each other. The autocovariance function $\underline{a}_{q,m}$ of the noise trace $\underline{d}_{q,m}$ then has the values $$a_{q,m;k} = V_{q,m} \delta_{k,o} \quad (24)$$

the variance $V_{q,m}$ representing the power (energy per data value) of the noise in the noise trace $\underline{d}_{q,m}$ and $$\delta_{k,o} = \begin{cases} 1 & k = o \\ 0 & k \neq o \end{cases}$$

The $\underline{A}_{q,m}$ are therefore diagonal matrices $$\underline{A}_{q,m} = V_{q,m} \underline{I}$$

and the probability distribution of the values of the noise trace $\underline{d}_{q,m}$ simplifies to $$P_{q,m}(\underline{d}) = (2\pi V_{q,m})^{-N/2} \exp[-\underline{d}'\underline{d}/(2V_{q,m})]. \quad (25)$$

The matrices $\underline{A}_j$ likewise have diagonal form $$\underline{A}_j = \alpha_j \underline{I}.$$

the diagonal elements $\alpha_j$ representing the power (energy per data value) of the noise in the j-th trace being calculated by means of the relation $$\alpha_{j+1} = V_{j,j+1} - \alpha_j, \quad (26)$$

and $\alpha_l$ being calculable by means of $$\alpha_1 = \tfrac{1}{2}\left[\sum_{j=1}^{J-1} (-1)^{j-1} V_{j,j+1} + V_{1,J}\right] \quad (27a)$$

for J odd and by means of $$\alpha_1 = \tfrac{1}{2}\left[\sum_{j=1}^{J-2} (-1)^{j-1} V_{j,j+1} + V_{1,J-1}\right] \quad (27b)$$

for J even, respectively.

With these $\alpha_j$ the probability distributions for noise $\underline{n}_j$ in the elementary traces have the form $$P_j(\underline{n}) = (2\pi \alpha_j)^{-N/2} \exp[-\underline{n}'\underline{n}/(2\alpha_j)] \quad (28)$$

and due to $$\underline{A}_j^{-1} = \alpha_j^{-1} \underline{I}$$

the sought-for most probable signal is equal to $$\underline{\sigma} = \left[\sum_j \underline{s}_j/\alpha_j\right] / \sum_j \frac{1}{\alpha_j} \quad (29)$$

that is equal to the sum of the weighted (with the reciprocal value of the energy of the noise contained in the traces) elementary traces, this sum being divided by the sum of the weight factors.

If, as was described in the aforegoing, the calculation of the probability distribution of the values of the noise traces is restricted to first and second order moments, then the conditions for the formation of noise traces can be further relaxed. The $g_{q,j}$ can be any real numbers satisfying only equation (14) and the condition that the matrix $\underline{G}$ has at least rank J. The following noise traces can serve for J=3 as an example for this subtraction.

$$\underline{d}_{1,-\tfrac{1}{2},-\tfrac{1}{2}} = \underline{s}_1 - \tfrac{1}{2}\underline{s}_2 - \tfrac{1}{2}\underline{s}_3$$

$$\underline{d}_{\tfrac{1}{2},-1,\tfrac{1}{2}} = \tfrac{1}{2}\underline{s}_1 - \underline{s}_2 + \tfrac{1}{2}\underline{s}_3$$

$$\underline{d}_{\tfrac{1}{2},\tfrac{1}{2},-1} = \tfrac{1}{2}\underline{s}_1 + \tfrac{1}{2}\underline{s}_2 - \underline{s}_3$$

In this case the covariance matrices $\underline{A}_j$ of noise in the elementary traces are obtained from the covariancematrices $\underline{A}_q$ of the noise traces with the aid of the relations $$\underline{A}_q = \sum_{j=1}^{J} g_{q,j}^2 \underline{A}_j \quad (30)$$

which, because of the restrictions on the $g_{q,j}$, allow a unique determination of the $\underline{A}_j$.

On deriving the relations between values of noise, it was supposed that these relations do not change with time; this assumption is in general only valid for short periods of time. It whill therefore prove necessary in general to divide each elementary trace into sections of a certain length and to apply the method described in the aforegoing not to whole elementary traces but to each of the sections. If a part of an elementary trace is for example 0.5 sec long, then an elementary trace of 10 sec length will be divided into a total of 20 sections. The method is then initially applied to the first sections of all elementary traces to be combined and the desired signal in this section determined. Thereafter, the same procedure is applied to the second sections of all elementary traces to be combined and the desired signal in the second section determined. This procedure is repeated until the desired signal has been determined for all sections.

In order to prevent discontinuities of the desired signal at the ends of the section caused by the variability of noise and statistical fluctuations, it may be necessary to choose the sections so that they overlap. Where the section has a length of 0.5 sec, the second section could begin not at 0.5 sec but at 0.4 sec, the third not at 1 sec but at 0.8 sec, etc. In the overlapping part of the sections, that is, in this example in the range from 0.4 to 0.5 sec, 0.8 to 0.9 sec, etc., the desired signal is formed by weighted averaging of the desired signals determined in both overlapping sections, the weights being chosen proportional to the distances from the end of each section. The sections need not of course be equal in lengths as long as all traces to be combined are divided into sections in the same way.

It is an essential prerequisite of this method that all single traces to be combined contain the same desired signal. If different signals are used to provide elementary traces to be combined (as described for example in U.S. Pat. No. 4,042,910) then these elementary seismograms do not contain the same desired signal. They must, therefore, be transformed prior to formations of the noise traces in such a manner that the desired signal will be the same in all elementary traces.

If traces are combined with one another, in which the desired signals are reflections from the same subsurface point, but in which generation and recording of the signal take place at different points (horizontal stacking), then the difference in propagation time due to the different signal paths must be eliminated prior to formation of the noise traces. This is performed in a known manner by making so-called static and dynamic corrections.

In addition to these kinematic corrections, amplitude corrections ought to be effected which account for different signal generation and also for a propagation path dependent on decrease in amplitude.

Correction factors, with whose aid different signal amplitudes can be counterbalanced, may be determined with the aid of the following method which is based on the equation $$\underline{s}_j = a_j \underline{\sigma} + \underline{n}_j \tag{31}$$

of the j-th elementary trace (j=1, ..., J). This relation only differs from equation (1b) by the factor $a_j$, the amplitude of the desired signal in the j-th elementary trace. In order that the $a_j$ be uniquely established, the relation $\underline{\sigma}'\underline{\sigma} = 1$ shall be used in the following, that is the signal energy is normalized to 1. The energy of the desired signal in the j-th elementary trace is hence $a_j^2$. To determine the $a_j$, the cross-correlation function of at least J elementary trace pairs is formed, each elementary trace appearing in at least one of these cross-correlations. If the noise is uncorrelated and also not correlated with the desired signal, the following relation will apply $$\underline{s}_q \underline{s}_m = a_q a_m \underline{\sigma}'\underline{\sigma} = a_q a_m \quad q \neq m \tag{32} \text{ ps}$$

Taking the logarithm of the relation (32) leads to the linear of equation $$\log(\underline{s}_q \underline{s}_m) = \log a_q + \log a_m \tag{33}$$

which completely corresponds to the system of equation (10) and which can be solved in the same way. In particular, it is likewise possible to suppress statistical fluctuations by forming more than J different cross-correlations of traces and solving the system of equation in the least squares sense. The use of all $J(J-1)/2$ possible different cross correlations will generally lead of course to the best values for the factors $a_j$.

If the elementary traces $s_j$ described by the equation (31) are multiplied by $1/a_j$, the desired signal will be the same in all elementary traces and the prerequisite will be fulfilled for the method of suppressing noise as described in the aforegoing.

The method of signal amplitude matching may be employed of course both in horizontal as well as in vertical stacking.

In summary and with reference to FIG. 4, the elementary seismic traces 10A through 10n are processed by a digital computer in accordance with equation (6) or (7) to yield difference traces $$\underline{d}_{q,m} = \underline{s}_q - \underline{s}_m$$

as indicated in block 18. The autocorvariance functions $\underline{a}_{q,m}$ for the $\underline{d}_{q,m}$ difference traces are determined by the computer, represented by block 20. Block 22 indicates that the next step is to develop the covariance matrix, as described hereinbefore, from the autorcovariance functions $\underline{a}_{q,m}$. The next step, block 24, calls for the determination of $\underline{A}_j$, the covariance matrices of noise in the elementary traces, in accordance with equations (19), (20a) and (20b). Finally, as indicated in block 26, the most probable value of the desired signal $\underline{\sigma}$ is determined in accordance with equation (23). The result is a single trace of seismic data in which the noise has been substantially suppressed.

What is claimed is:

1. A method for suppressing noise trains in seismic data representative of detected multiple seismic events and noise by a plurality of seismic detection means so as to provide enhanced seismic data, comprising (a) deriving elementary seismic traces data for each seismic detection means from the seismic data representative of detected seismic events by said seismic detection means, (b) deriving elementary seismograms from the elementary siesmic trace, (c) combining at least two elementary seismograms in a manner to derive noise seismograms, the number of noise seismograms being at least equal to the number of elementary seismograms to be combined to form a final seismogram, (d) determining the probability distribution of noise for each trace of the noise seismogram, determining the probability distribution of noise in said traces of the elementary seismograms from the probability distributions of noise in the traces of the noise seismograms; and (f) providing the enhanced seismic data from the seismic data in accordance with the probability distribution of step (e).

2. A method as claimed in claim 1 in which the seismic data comes from different transmitting and recording points having a common point of reflection.

3. A method as claimed in claims 1 or 2 wherein at least three like signals are emitted from substantially the same point.

4. A method as claimed in claim 3 characterized in that the elementary traces are multiplied prior to formation of the noise traces with factors which are proportional to the reciprocal value of the root from the energy of the desired signal contained in the trace.

5. A method as claimed in claim 4 in which noise traces are formed from two different elementary traces.

6. A method as claimed in claim 4 in which the number of formed noise traces is equal to J or a multiple of J.

7. A method as claimed in claim 6 in which all $J(J-1)/2$ possible noise traces are formed.

8. A method as claimed in claim 7 in which the elementary traces to be combined are divided in a like manner into sections and that the probability distribution of noise is determined for each section.

9. A method as claimed in claim 8 in which the sections overlap.

10. A method as claimed in claim 8 in which the probability distribution of the values of noise is described by an N-dimensional Gaussian distribution, N representing the number of digital values forming a trace.

11. A method as claimed in claim 10 in which the energy of noise is determined in the noise traces or noise trace sections, that therefrom the energy of noise is determined in the elementary traces or elementary trace sections, and in which the desired signal is formed by weighted averaging from the elementary traces, the weights being proportional to the receiprocal values of the energy of noise contained in the elementary traces concerned.

12. A method as claimed in claim 11 in which at least three elementary seismograms are combined to form one final seismogram.

13. A method as claimed in claim 12 in which in instances where the elementary seismograms to be stacked have different reflection times caused by different points of signal generation and recording, these seismograms are subjected before stacking to a time shift known per se termed a dynamic or static correction.

14. A method as described in claim 1 in which the seismic events involved the transmission of signals which differed in phase and step (a) includes;
processing the seismic data from the seismic detection means to adjust for the differences in transmitted signals, so that the later derived elementary seismograms of step (b) would appear as if derived from a common transmitted signal.

* * * * *